April 7, 1970    KENZO ISHIMARU ET AL    3,505,024
MICROCALORIMETER FLOW CELL

Filed Dec. 11, 1967    4 Sheets-Sheet 1

INVENTORS
KENZO ISHIMARU
JACK I. OHMS

BY
ATTORNEY

April 7, 1970 KENZO ISHIMARU ET AL 3,505,024
MICROCALORIMETER FLOW CELL
Filed Dec. 11, 1967 4 Sheets-Sheet 2

INVENTORS
KENZO ISHIMARU
BY JACK I. OHMS
BY
ATTORNEY

United States Patent Office 3,505,024
Patented Apr. 7, 1970

3,505,024
MICROCALORIMETER FLOW CELL
Kenzo Ishimaru, San Jose, and Jack I. Ohms, Palo Alto, Calif., assignors to Beckman Instruments, Inc., a corporation of California
Filed Dec. 11, 1967, Ser. No. 689,361
Int. Cl. G01k 17/04
U.S. Cl. 23—253
21 Claims

ABSTRACT OF THE DISCLOSURE

A continuous flow reaction vessel for use in a microcalorimeter having a heat sink assembly comprising a heat sink body with an axial bore extending in the longitudinal direction, an area thermopile bonded to the inner surface of the axial bore for sensing the heat associated with a chemical reaction. The reaction vessel is shaped in the form of a continuous tubular conduit for carrying the chemical reactants whose heat of reaction is to be monitored and includes a first portion which is wound around the outside surface of the heat sink body a sufficient number of times to provide thermal equilibrium throughout the system and a second portion which is inserted inside the axial bore in such a fashion that at least a portion of its outer surface is disposed in intimate contact with the area thermopile so that the heat produced by the reaction may be continuously and accurately monitored.

BACKGROUND

The present invention relates generally to calorimetric systems and techniques for determining the precise magnitude and rate of heat flow produced as a consequence of chemical or biochemical reactions and the like, and more particularly to reaction vessels used in connection with microcalorimeter systems.

Since heat is liberated or absorbed in relation to the occurrence, rate, extent or quantity of any chemical change, calorimetry may become a recognized analytical tool, universally applicable for the quantitative investigation of chemical reactions. One of the limitations restricting its application, however, is the requirement that only the reaction under study and no other heat producing or absorbing process be present during the analytical observation. This shortcoming is more than offset by the fact that calorimetric equipment and processes are not disturbed by the mere presence of any variety or quantity of other inert materials. Moreover, they do not require any physical or chemical interference in the system under study nor require any specific properties of the reactants or products such as optical characteristics, precipitation of a solid, or liberation of a gas.

The classical approaches for measuring entropy and energy by, for example, low temperature physics and bomb calorimetry are in the main relatively cumbersome and prone to error since they measure relatively small differences between large quantities. Also, the conventional equipment requires substantial amounts of materials, a characteristic which often precludes their employment in biochemical work. The inability of these systems to detect very small amounts of heat which last for brief moments also prevents their effective use in biochemical experiments.

In classical calorimetry, heat is defined as the product of a change in temperature with the heat capacity of the system in which it occurs. Conventional calorimetric procedures, therefore, involve the measurement or compensation of a temperature difference between a blank or a heat sink and the reactant solution in a thermally insulated vessel. With these methods, the difference of temperature between the two systems available as a potential source of energy is not utilized. Stated somewhat differently, after the temperature difference is once determined, this differential, which may be considered the potential thermal energy of the system, remains untapped. When thermal equilibrium is reached or when balancing quantities of energy are supplied to the blank and measured, the potential thermal energy just referred to disappears. With the principle and method of heat-burst microcalorimetry, this potential thermal energy is fully utilized to produce the signal and thereby to improve the sensitivity of the temperature detecting apparatus.

To understand the heat-burst principle, consider the case in classical calorimetry where an instantaneous reaction is proceeding in a bulk of solutions, this bulk being effectively suspended in perfect thermal isolation except for the conductance of a single pair of copper-constantan conductors extending between the reacting bulk and a heat sink. As is well known, at the junction of these dissimilar conductors, a very small potential appears and this potential lasts almost indefinitely if the conductors have an infinitesimally small cross section. Of course, the heat eventually leaks out almost unnoticed through the conductance of the thermocouple wires but, if the magnitude of the potential is taken immediately, no further use is made of the temperature differential present in the system.

Consider the case, now, where the bulk solution, instead of carrying one or a few thermocouples, is spiked throughout its volume with an almost infinite number of thermocouples, each measuring the temperature in an almost infinitesimally small segment of the solution. A potential will be developed in each of the individual couples in response to the instantaneous chemical reaction. The magnitude of each of these potentials will, of course, be the same as that registered with the single thermocouple in the previous system. In each case, of course, the magnitude is determined uniquely by the rise in temperature brought about by the chemical reaction. In contrast with the measurement by a single thermal junction, the potentials appearing at the multiple couples will not persist. Rather, they will decay quite rapidly in an exponential fashion since the multiple conduction paths provided by the numerous thermocouple wires effectively drain the heat from the reaction vessel into the heat sink within a relatively short time. Before the heat is exhausted, however, the temperature level of the system can be recorded with electronic instruments designed to record transient or rapidly recurring voltage wave forms. What is most important, however, is that all of the individual signals occurring at the different thermal junctions can be combined additively by serially connecting the thermocouples. The resultant signal would then have a peaked wave form and its amplitude at any one time could be analyzed to indicate the behavior of the chemical reaction under study. In the prior art methods, the amplitude of the output signal is relatively small and its duration relatively long, a characteristic which is of no particular value in the measuring operation.

The fundamental difference between the heat-burst principle and the application of multijunction thermopiles in prior art calorimetric apparatus is that in the latter, the thermopiles are resorted to in order to enhance the sensitivity of the temperature measurement at a certain site within the bulk solution with a minimum of heat loss through the thermopile. A typical part-time response for instruments of this type is somewhat in the order of 20,000 seconds. In contradistinction, the heat-burst principle of the present invention discharges the heat at a maximum velocity from every segment of the solution into a heat sink through a multiplicity of cooperating thermopiles, the energy of the thermal flux thereby being converted entirely and immediately into a short but powerful electrical signal.

In a commonly used microcalorimeter system, the bulk solutions to be reacted are spread over the surface of a hollow, double-walled, cylindrical vessel, an arrangement which allows a multiplicity of thermal junctions to cooperate with relatively small segments of the solution. The outer wall of the reaction vessel is placed in thermal contact throughout most of its area with what might be called an "area thermopile." This pile in appearance is somewhat like a carpet structure of copper-constantan conductors arranged physically in parallel for thermal conduction and in series for electrical conduction. Each of these conductors extends between the outer surface of the reaction vessel and the heat sink. This configuration has several main advantages, namely, the thermoelectric potentials are additive for multiplication of the signal response, the problems and imperfections involved in thermal insulation are eliminated because the solution is kept in solid thermal contact with the heat sink via the thermopile over substantially all of its entire surface. Furthermore, disturbing influences of external temperature variations are reduced by shortening the time of response of the instrument and likewise the duration of the measurement. Thus, by means of the heat-burst principle, sensitivity to instantaneous reactions is increased, speed of response to changing rates of heat flow is improved, inertial distortions are reduced and external disturbances are minimized. Such characteristics are desirable in biochemical investigations involving enzyme kinetics, virus-host relationships, invasion of cells, fertilization and mitosis. Furthermore, the increased speed of response available enhances the power of resolution in heat measurements of the type wherein it is desired to investigate independently an initial heat-burst event followed by continued heat production. This is the case, for example, when enzyme substrate-combination or ionic interactions precede the slow enzymic transformation of a substrate.

Generally, presently used microcalorimeters employ the concept of twin calorimetry to minimize external thermal disturbances which may be present even for the short durations involved. In twin calorimetry, identical reaction and blank or reference vessels are housed within a common heat sink and each provided with an identical area thermopile. The area thermopiles are connected in series opposition to cancel out any voltage due to heat not resulting from the reaction itself.

The blank and reaction vessels are inserted in either end of a cylindrical-like bore provided in the heat sink body. The reactions vessels typically take the form of a double-wall cylinder with the reactants located between the concentric cylinder walls of the vessel. Several different configurations of reaction vessels formed along these lines are illustrated and discussed in detail in U.S. Patent No. 3,273,968. Although these reaction vessels allow the reactant solutions to be spread over a large surface area, which is desirable, they are still limited in several important characteristics.

First, in the interest of accuracy the reactants must not be mixed, even in the slightest degree, prior to being inserted into the heat sink body. Any mixing before insertion would result in some undetected heat being produced by the reaction. Moreover, to fill the reaction vessels with the chemical reactants at present, the entire microcalorimeter assembly must be disassembled and then reassembled to introduce the reactants into the system, which is no small job in and of itself. Therefore, it will be appreciated that the filling and handling of present reaction vessels is extremely tedious and time consuming to say the least.

Secondly, present reaction vessels require the use of external forces to completely mix the various reactants. This is generally accomplished by rotating the calorimeter assembly, once the reaction vessels have been inserted therein, in a predetermined programmed manner. Such rotation may result in zero spikes or mixing blanks caused by heat changes introduced artificially by the mixing motions. These zero spikes can be a substantial source of error and arise in particular from the inversion of thermal gradients in the reactants, from heat or friction, from changes of pressure associated with evaporation or condensation in the reaction vessel, and from other causes the exact nature of which has not as yet been precisely determined.

Finally, present reaction vessels may inadvertently contain vapor spaces after filling, thus making the system dependent upon the heats of vaporization of the chemical reactants. In other words, vapors of the reactants may intermix or premix resulting in an erroneous reading.

SUMMARY

The present invention contemplates a reaction vessel in the form of a continuous flow cell for use in a microcalorimeter which eliminates the problems and concomitant limitations associated with presently available reaction vessels. To this end there is provided a heat sink assembly including a heat sink body having a generally cylindrical axial bore extending through the body in a longitudinal direction. Two twin area thermopiles are helically wrapped around the outer surface of two independent metallic sleeves with each sleeve in turn being inserted from opposite ends into the cylindrical bore of the heat sink body. The outer surface of each area thermopile is bonded to the inner surface of the cylindrical bore to provide a continuous heat conductive path from each metallic sleeve through the respective area thermopiles to the heat sink body. A pair of tubular conduit members pass through the heat sink assembly with each tube adapted to carry one of the chemical reactants to be reacted. Each tube is wrapped one or more times around the outer surface of the heat sink body at about the center thereof and extends along the outer surface to the end of the body. From this point both tubes extend downwardly into the axial bore and are joined together by a mixing T disposed immediately inside the bore opening. A single tubular outlet line leads out of the mixing T and is wound around a flexible-like split core member, which core member is inserted into the cylindrical bore approximately half the distance through the heat sink body, in a helical fashion to provide a reaction cell. The tubular member then returns back to the bore opening from which it entered, runs along the outer surface of the heat sink body opposite to that surface over which the tube first extended, and is wound once around the outer surface of the heat sink body at about the center thereof. The tube continues in a longitudinal direction along the outer surface of the body to the end thereof and finally re-enters the cylindrical bore in the body from the end opposite that from which the tube first entered. At this point the tube is wound around a second flexible-like split core member, which member is placed inside the bore next to the end of the first split core member, in a helical fashion to form a reference cell. The tube then returns outside the bore, extends up to the top surface and along this upper surface toward the center of the heat sink body. Thus, it will be appreciated that the flow cell comprises one continuous tubular member with a first portion of the tubular member being wound around a first split core member to provide a sample or reaction cell and a second portion of the tubular member being wound around a second split core member to provide a reference cell. In this manner a chemical reaction may be carried out for monitoring its heat of reaction by merely introducing the chemicals to be reacted into the tubular flow cell by way of the mixing T.

Accordingly, a primary object of the present invention is to provide a new and improved reaction vessel for use in a microcalorimeter.

Another object of the present invention is the provision of a continuous flow cell for use in a microcalorimeter.

A further object of the present invention is the provision of a mirocalorimeter flow cell which takes the form of a continuous tubular member.

Another object is the provision of a tubular member having a first portion forming a reaction cell and a second portion forming a reference cell.

Still a further object of the present invention is a microcalorimeter which requires much less solutions, quantitatively speaking, to derive the heat of reaction.

Another object is the provision of a microcalorimeter which overcomes the disadvantages and concomitant limitations of present microcalorimeters.

A further object of the present invention is the provision of a flow cell which allows the chemical reactant to be introduced into the system without disassembling and reassembling the microcalorimeter.

Still a further object is the provision of a reaction vessel which eliminates any inadvertent mixing of the chemical reactants.

A further object of the present invention is the provision of a microcalorimeter continuous flow cell in which the chemical reactants are automatically mixed to provide the heat of reaction without rotating the microcalorimeter heat sink assembly.

A further object of the present invention is the provision of a microcalorimeter which is insensitive to zero spikes.

These and other objects and advantages of the invention will become apparent from the following detailed description when read in conjunction with the accompanying drawings in which.

Figure 1:
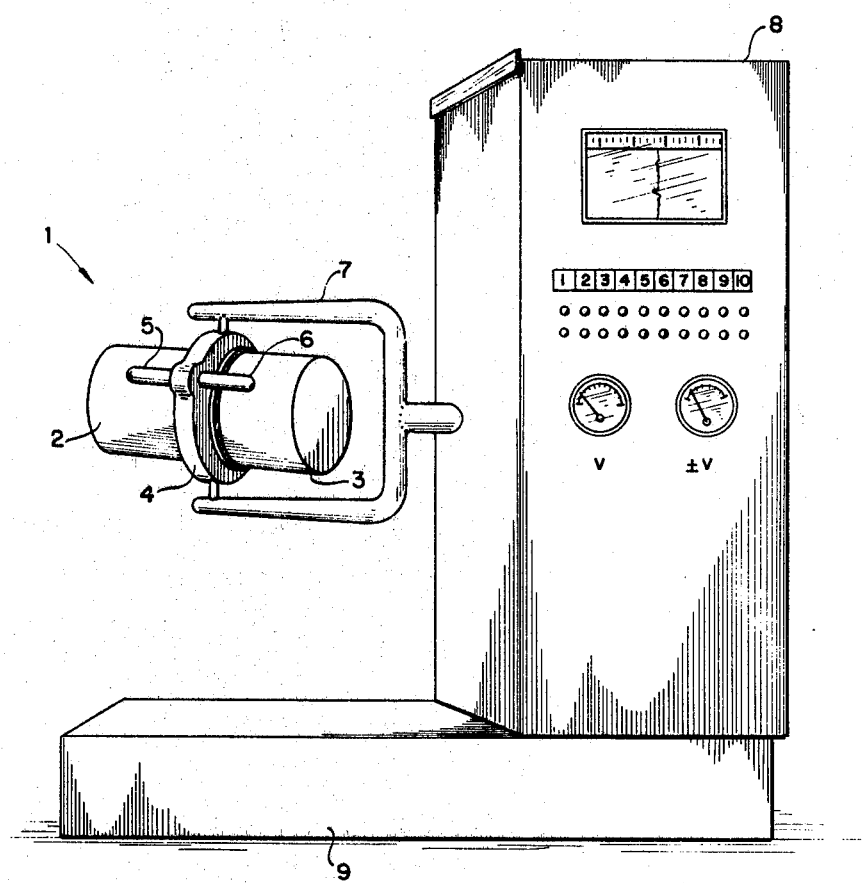
FIG. 1 is a perspective view illustrating the microcalorimeter in conjunction with the recording system.
Figure 2:
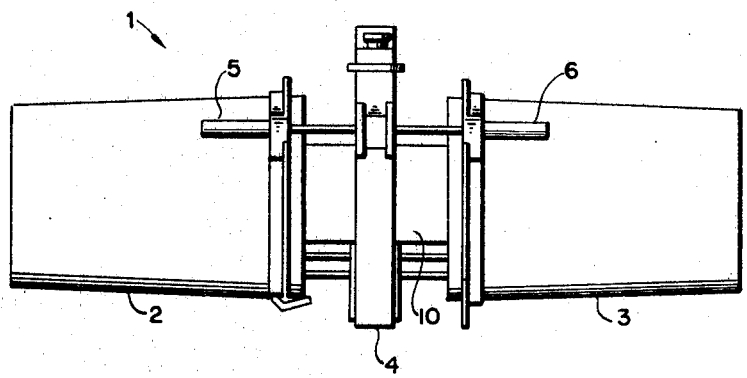
FIG. 2 is a perspective view showing the right and left cup-like shaped sides of the insulating shell enclosure partially withdrawn to expose the heat sink assembly.

With reference now to the drawings and more particularly to FIGS. 1 and 2 thereof, the reference numeral 1 designates an insulated shell member inside of which is disposed a heat sink assembly 10. The shell 1 includes a left cup-like half 2 and a right cup-like half 3 provided with handles 5 and 6, respectively, to enable them to be moved longitudinally away from each other to gain access to the heat sink assembly 10. A center support ring 4 surrounds the junction of the two half shells of the insulating shell member 1 and is pivotally mounted in a U-shaped yoke member 7. By means of the pivotally mounted center ring the insulating shell member may be rotated in a horizontal plane to either a diagonal position with respect to the yoke, a perpendicular position with respect to the yoke (FIG. 2), or a parallel position with respect to the yoke. Yoke 7 is in turn rotatably connected to an electrical drive unit mounted inside a console cabinet 8 supported by a base 9 which cabinet also includes a recorder for displaying a signal representative of the total heat quantity produced by the reaction. The electrical drive unit may be programmed to rotate the microcalorimeter assembly in a predetermined manner to thereby mix the reactants and initiate the heat burst reaction. However, in accordance with the principles of the present invention, it is not necessary to rotate the microcalorimeter assembly since the heat burst reaction is automatically initiated by the continuous flow of the reactant into a single tubular flow line. Thus, if desired, by using the present invention the yoke 7 may be fixedly mounted to the console 10 and the programmed drive motor omitted.

Figure 3:
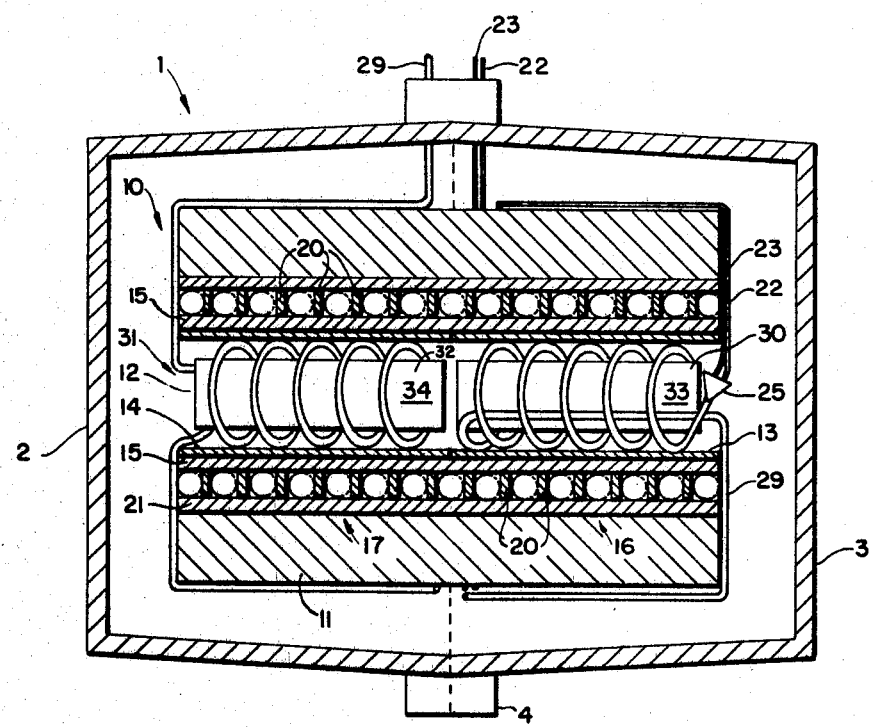
FIG. 3 is a longitudinal cross section of the microcalorimeter assembly with the flow cell of the principles of the present invention being illustrated in diagrammatic form.

Referring now to FIG. 3 there is shown a longitudinal section of the microcalorimeter assembly which includes the insulated shell member 1 and the heat sink assembly 10 housed inside the insulating shell 1. As previously discussed, the insulating shell comprises two cup-like halves 2 and 3 joined together by a center support ring 4.

Heat sink assembly 10 includes a generally cylindrical heat sink body 11 having a generally cylindrical bore 12 extending through the axis of the body 11 in a longitudinal direction. The heat sink body 11 may be formed from aluminum or any other suitable metal and in practice takes the form of a threepiece thickwalled aluminum cylinder which is supported from the center support ring by three suspension wires. A pair of cylindrical metal sleeves 13 and 14, also usually formed from aluminum, are inserted into the bore 12 and placed end to end at about the center of the heat sink body 11. Secured to the outer surface of each sleeve is a sheet or layer of electrical insulating material 15 formed of mica or any other suitable dielectrical material. For additional electrical protection each metallic sleeve may have its outer wall anodized. It should be understood that although insulation 15 provides excellent electrical insulation it is still a good heat conductor.

Figures 4, 5:
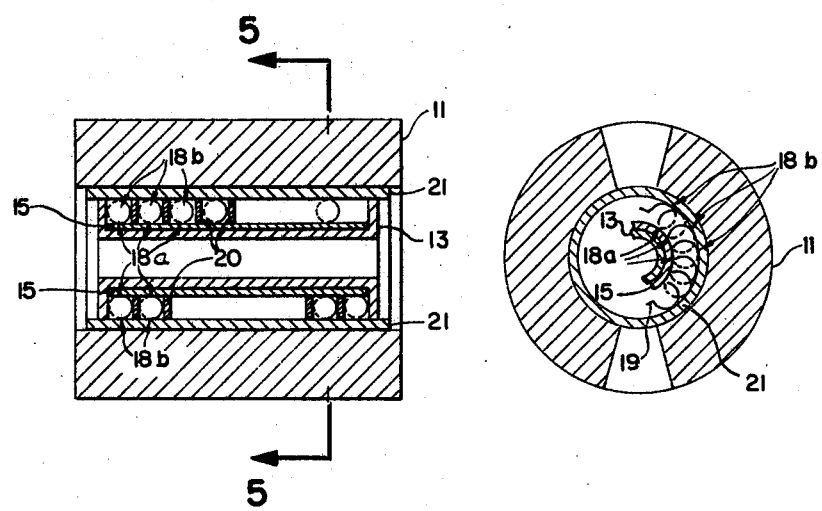
FIG. 4 is an enlarged cross section of a portion of the heat sink assembly constructed according to the present invention which illustrates the heat burst principle.
FIG. 5 is a partial section depicting the manner in which an area thermopile cooperates with the flow cell and heat sink assembly of the present invention.

Contacting insulation sheet 15, which is in close thermal contact with the outer surface of the sleeves 13 and 14 to enhance the heat conduction characteristics, is a pair of "area thermopiles" 16 and 17, respectively, made up of a multiplicity of thermal junctions, identified by arrows 18a and 18b (FIG. 4). These junctions which may number in the thousands are formed by winding a constantan conductor 19, which may be best seen in FIG. 5, in a helical fashion around a piece of nonmetallic tubing, such as polyethylene, having a diameter of about 0.110 inch (not shown for purposes of clarity), and copper plating half of each individual turn therof, the dissimilar metallic sections being represented by the dotted and solid lines in both FIGS. 3 and 5. That is to say, the junctions between the dotted and solid lines of each turn of the constantan wire form a thermal couple. Such junctions between the plated and the nonplated portions thus serve as a temperature sensing element and occur diametrically opposite the points of each turn of the helical wire. After the thermal junctions are so fabricated, the helical structure is then coiled about the entire outer surface of the metallic sleeve 13 so that alternate junctions confront the sheet of insulation 15. In other words, the above configuration results in the formation of two opposing rows of junctions of constantan and copper plated constantan to form a thermal couple at each end of conductor 19.

A plurality of flat, annular, spacer rings 20, made of Bakelite, for example, each ring being provided with a radial cut at one point on the surface thereof, are inserted one after the other between individual turns as the helical winding wire 19 is wound in place over each aluminum sleeve 13 and 14. The sequence of spacer ring 20 thus forms a continuous spiral separating the adjacent turns electrically. Each area thermopile assembly 16 and 17 is then enclosed within heat sink body 11 with the outer surface of each area thermopile being directly bonded to the inner surface of the heat sink body 11 by means of a bonding material 21. Electrical shorting of the thermal junction 18b which confronts the inner wall of the heat sink 11 is prevented by the electrical insulation provided by the bonding sheet 21 disposed between the surfaces.

From an examination of FIG. 5 it will be readily seen that thermal junctions 18a are in tangential relationship with respect to insulating sheet 15 and, therefore, effectively sense the temperatures at a multiplicity of discrete points about the surface of sleeve 13. In addition, it will be appreciated that thermal junctions 18b are in a tangential relationship with bonding sheet 21 and hence sense the temperatures at a similar multiplicity of discrete points about the inner wall of the heat sink 11. For purposes of discussion thermal junctions 18a will be referred to as "hot junctions" while thermal junctions 18b will be referred to as "cold junctions."

The electrical performance of the thermopile so described is, as is well known, such that opposite polarized voltages are generated at the hot and cold junctions. By virtue of this characteristic the output signal of the thermopile is a differential voltage whose magnitude is a function of the difference in temperature between the reaction solutions and the heat sink. To permit this temperature to be directly measured, the heat sink should be maintained at a relatively constant reference temperature. This is accomplished by proportioning its vertical geometry so that it may absorb the total heat generated by the chemical reaction without having the temperature appreciably increase.

The heat developed by the chemical reaction is conducted first to each metallic sleeve 13 and 14, then to the individual turns of each area thermopile 16 and 17, respectively to the heat sink body 11. Since a typical area thermopile might contain thousands of these turns, the heat is exhausted from the reaction vessel at a relatively high rate. Consequently, the output voltage waveform rapidly increases to a maximum. Its amplitude at any one time is a function of the rate of heat produced by the reaction and may be accurately ascertained.

Figure 6:
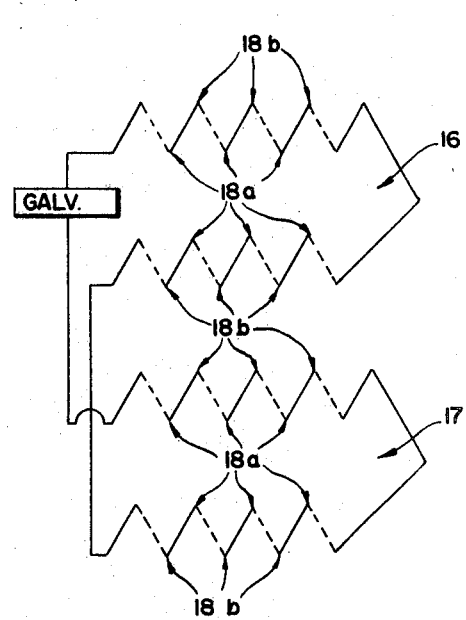
FIG. 6 is a wiring diagram indicating the manner in which the two area thermopiles are connected.

The nature of the connection of the two area thermopiles 16 and 17, respectively, may be best understood with reference to FIG. 6. The two terminals from each of the area thermopiles 16 and 17, one of which cooperates with the reference flow cell, formed from a first portion of a tubular outlet line and the other of which cooperates with the sample flow cell formed from a second portion of the tubular line, are brought to the outside of the insulating shell 1 through suitable apertures located in center support ring 4 and wired in series opposition for amplification and potentiometric recording. From an inspection of FIG. 6 it will be observed that the hot junctions 18a and the cold junctions 18b of both area thermopiles 16 and 17 are in an additive type arrangement. However, both pairs of hot and cold junctions are in series opposition in the overall series circuit. In other words, area thermopiles 16 and 17 are connected in series opposition. In this manner, changes in the heat sink temperature as well as heat generated by the friction from the movement of the reactants through the flow cells are for the most part compensated.

Figure 9:
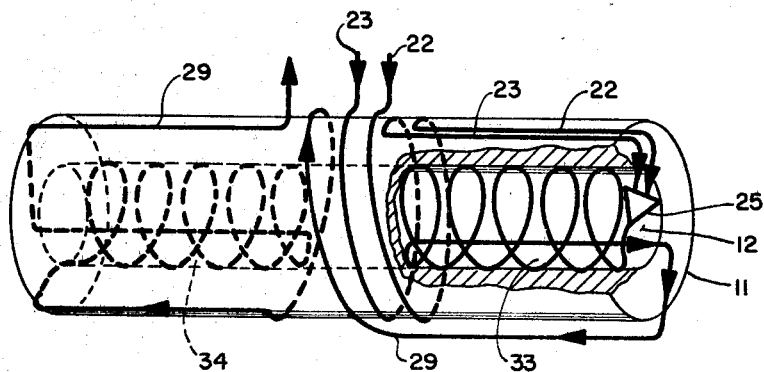
FIG. 9 is a perspective view of the heat sink assembly partially broken away to more clearly show the tubular conduit winding configuration.

Referring now to FIG. 3 and FIG. 9, the nature and specific configurations of the flow cell in accordance with the principles of this invention will now be discussed. A pair of small diameter inlet tubes 22 and 23, respectively, each of which is adapted to carry a chemical reactant, extend through a pair of apertures located next to one another in the center support ring into the space between the insulating cell 1 and the heat sink assembly 10. In practice this space is filled with a suitable heat insulation material which aids in maintaining the heat sink assembly at a predetermined constant temperature. Both inlet tubes 22 and 23 are wound once around the outer surface of the heat sink body 11 at approximately the center thereof and then extend in a longitudinal direction along the right-hand portion of the outer surface to the end of the heat sink body 11. Of course, it will be appreciated that the number of times the tubular conduits pass around the outer surface of the heat sink body for thermal equilibrium is dependent on the particular material from which the tubes are fabricated and the flow rate of the fluids passing through the tubes. Accordingly, it will be understood that the illustrated tubular configuration is for purposes of description only and should not be construed as a limitation of the invention. The two inlet tubes are then wrapped around the end of the heat sink body, enter the axial bore 12 at opening 13 and are joined together by means of a mixing T 25 which is disposed inside the cylindrical bore 12. In practice, the T is placed inside the bore at about the middle of the area thermopile but, for purposes of clarity, it has been shown toward one end of the bore. Mixing T 25 may take the form of a conventional mixing T having two inlet branches to which the aforementioned inlet tubes are coupled and a single outlet branch to which an outlet tube is attached.

The two fluid carrying tubes 22 and 23 may be fabricated from small bore Teflon tubing having an inside diameter of .027 inch and a cross-sectional wall thickness of .010 inch. Of course, it will be appreciated that instead of the flexible Teflon tubing the inlet tubes may be formed from selected noble metals such as platinum, which, although reducing the flexibility of the tubing, would improve the heat transfer between the reactant carried by the tubing and the heat sink assembly.

An outlet tubular conduit 29 leading from the mixing T 25 carries the reactants whose heat is to be monitored and is preferably wound in a helical fashion around the outer surface of a first generally cylindrically split core member 30 which is characterized by a low heat capacitance. The outlet conduit 29 may be twice the volume of one of the inlet tubes but this is not essential to the proper operation of the invention. The first split core 30 is approximately half the length of the heat sink assembly 10 and is adapted to be inserted into the bore 12. After being wound for approximately a distance of about one meter along the outer surface of the split core member 30, outlet tube 29, through which the reactants flow, is returned toward the right of the heat sink body 11 and brought out of the end of the bore 12 at opening 13 and extended in a longitudinal direction back toward the center of the assembly 10 along the lower surface of heat sink body 11. The tubular conduit 29 is then wound around the outer surface of the heat sink body 11 closely adjacent to the location where the inlet tubes 22 and 23 are wound around the body 11. Tubular member 29 then continues along the lower surface of the heat sink body 11 toward the left end thereof. From this point conduit 29 is again led into the bore 12 by way of opening 31 and wound in a helical fashion around a second split core member 32 for a distance of about one meter. The tubing is then brought back out the left side opening 31 of the bore 12 and returned along the left hand portion of the heat sink body 11 toward the center piece 4. Arriving back at the centerpiece 4 the tubular conduit 29 is then led to the outside of the insulating shell 1 by way of a small aperture provided in the center support ring 4. It will be appreciated from the above discussion that the inlet tubes 22 and 23 and the tubular conduit 29 form a continuous flow cell line which is adapted to carry the fluid samples to be reacted. As may be best seen in FIG. 9, both inlet tubes 22 and 23 and the tubular conduit 29 are in juxtaposition with either the outer or inner surface of the heat sink body 11 at all times throughout their travel in and around the heat sink assembly.

As may be readily seen from an inspection of FIG. 3, that portion of the tubular conduit 29 which resides in the right-hand section of bore 12 in close contact with area thermopile forms a reaction flow cell 33 while that portion of conduit 29 which is housed inside the left-hand section of axial bore 12 in close contact with area thermopile 17 defines a reference cell 34. In other words, the fluid samples transmitted through tubular inlet lines 22 and 23 are mixed or reacted in reaction cell 33 to produce the heat which is monitored by area thermopile 16. After the initial reaction the mixed reactants are carried by tubular conduit 29 through the reference cell which thereby aids in the provision of thermal equilibrium throughout the microcalorimeter system.

Figure 7:
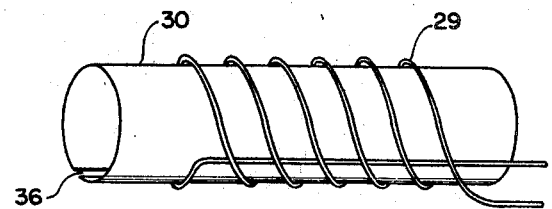
FIG. 7 is a diagrammatic view showing one arrangement of the tubular flow cell on the split core member.

The reaction flow cell formed by the tubular conduit 29 wound around the split core member 30 may be more clearly seen with reference to FIG. 7. In this figure it will be observed that the tubular conduit 29 is wound in a helical fashion around the outer surface of member 30 for a distance of about one meter. That is, the total length of tubular conduit 29 which is in intimate contact with the sensitive surface of area thermopile 16 is approximately one meter. The member 30 in turn has a narrow slit 36 along its entire length in a longitudinal direction so that member 30 becomes somewhat flexible in nature. In this maner the split core member 30 tends to force the outside surface of the fluid carrying tubular conduit 29 tightly against the inner surface of the metallic sleeve 13 to provide an excellent heat conduction path between the conduit 29 and the area thermopile 16. Of course, although the member 30 provides sufficient force to maintain tubular conduit 29 in close contact with metallic sleeve 13, the force is not so great as to cause any appreciable indentations or "crimps" in the tubing itself which obviously would tend to obstruct the smooth flow of the reactants through the reaction flow cell 33. The split core members 30 and 32 are inserted from either end of the bore 12 and disposed so that there is a small gap between the members at about the bore center to prevent heat from being conducted from one member to the other.

Figure 8:
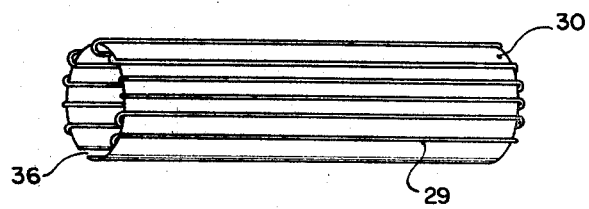
FIG. 8 is a diagrammatic view of another embodiment showing an alternate configuration of the tubular flow cell on the split core member.

Turning now to FIG. 8 there is shown an alternative winding configuration which may be used to form reaction flow cell 33. In this embodiment tubular conduit 29 is wound around the periphery of split core member 30 in a longitudinal direction as opposed to the lateral direction of FIG. 7. It will be appreciated that both split core members 30 and 32 are alike and that the winding configurations of the reaction flow cell 33 and the reference cell 34 are also alike. That is, if the reaction cell is wound in a helical fashion so is the reference cell.

Referring again to FIG. 4, in operation the chemical fluids or solutions to be reacted are fed from an appropriate container to tubular inlet lines 22 and 23. That is, each inlet line carries one of the reactants. Of course, it will be appreciated that the flow rate of the reactants may be regulated by appropriate valve controls (not shown) inserted in the respective inlet tubes 22 and 23.

The reactants are transmitted through inlet tubes 22 and 23 to mixing T 25 wherein the reactants are fed into a single outlet tubular conduit 29. As the reactants flow through the portion of the tubular conduit 29 forming reaction flow cell 33 they are automatically reacted with one another to produce the heat of reaction which heat is simultaneously sensed by area thermopile 16. Thus, it is apparent that pursuant to the principles of the present invention, rotation of the reaction vessel to mix the reactants so as to produce the desired heat of reaction is not required.

After passing through reaction flow cell 33 the reactants are transmitted in a continuous stream by way of tubular conduit 29 to reference cell 34. The path of the reactants then continues through reference cell 34 and finally to a receiving container (not shown) via tubular conduit 29.

It will be appreciated that the area thermopiles 16 and 17 are not only sensitive to the heat produced by the chemical reactions itself, but also, to other extraneous heat producing factors, such as heat of friction due to the flow of the reactants through the tubular conduits 23 and 29. To eliminate extraneous signals caused by these incidental heat producing actions the twin calorimetry principle is utilized. That is, as will be recalled, the area thermopiles 16 and 17 which cooperate with the reaction flow cell 33 and the reference cell 34, respectively, are connected in series opposition. Hence extraneous signals produced in the reaction cell are canceled by corresponding extraneous signals produced in the reference cell. It should be emphasized in this regard that the chemical reaction producing the heat of reaction is completed in its entirety as the reactants pass through the reaction flow cell 34. It follows that the signal representing the desired heat burst caused by the reaction has no counterpart in the reference vessel (since no reaction occurs in the reference vessel). Consequently, whereas all extraneous signals are canceled due to the series opposition configuration of the area thermopiles 16 and 17, the voltage signal produced by the heat of reaction is not canceled and appears by itself across the output of the area thermocouple as an accurate representation of the heat of reaction.

In order to insure the complete cancellation of all extraneous signals the microcalorimeter system, as previously mentioned, must be maintained in thermal equilibrium. In other words, the reaction cell and the reference cell 33 and 34, respectively, must be thermally balanced. With this in mind, each inlet tube 22 and 23, as well as outlet tubular conduit 29, is wound around the outside surface of the heat sink a sufficient number of times to insure that the heat of the chemical reactants rises to and is maintained at the same heat exhibited by the heat sink assembly so that the system operates in thermal equilibrium. Moreover, the reactants travel through substantially identical tubular volumes as they pass through the reaction cell and the reference cell of the system. In other words, the internal surface area over which the fluids travel, which internal surface area contributes to the heat of friction, is the same for both cell portions of the system. Thus, extraneous signals resulting from heat of friction are effectively canceled.

Numerous modifications and departures from the specific apparatus described herein may be made by those skilled in the art without departing from the inventive concept of the invention. For instance, the tubular lines utilized throughout the system may be fabricated from various materials dependent upon the desired performance characteristics. Also, tubular winding configurations other than those particularly described may be used throughout the microcalorimeter system. Accordingly, the invention is to be construed as limited only by the spirit and scope of the appended claims.

What is claimed is:

1. A heat-burst microcalorimeter for monitoring heat produced by a chemical reaction comprising a heat sink assembly including a thermally conductive heat sink body having a bore therein, an area thermopile for providing an electrical signal representative of the heat produced by the reaction disposed within the bore with the outer surface of the thermopile being in thermal contact with the bore surface, and conduit means for circulating the chemical reactants relative to the heat sink assembly, said conduit means having a first opening through which the chemical reactants are introduced and a second opening spaced from said first opening through which the chemical reactants are withdrawn so that the reactants flow as a stream through the conduit means, at least a portion of said conduit means being disposed within said bore in a thermally conductive relationship with said area thermopile, the chemical reactants being mixed to provide a chemical reaction only in said latter portion of the conduit means.

2. A heat-burst calorimeter as defined in claim 1 wherein said conduit means comprises a pair of tubular conduits each of which carries at least one chemical reactant and a third tubular conduit, each of the tubular conduits being in contact with the outer surface of said heat sink body over a sufficient distance to maintain the calorimeter system in thermal equilibrium, said third tubular conduit having at least a portion disposed in a thermal conductive relationship with said area thermopile and means to connect the first and second tubular conduits with said third tubular conduit whereby the chemical reactants are transmitted from the first and second conduits to the third conduit wherein the reactants are mixed to produce a chemical reaction.

3. A heat-burst calorimeter as defined in claim 2 wherein said connecting means is disposed inside the bore of said heat sink body.

4. A heat-burst microcalorimeter as defined in claim 2 wherein said tubular conduits are made of Teflon.

5. A heat-burst microcalorimeter as defined in claim 2 wherein said tubular conduits are made from a noble metal.

6. A heat-burst calorimeter as defined in claim 2 wherein said connecting means comprises a three leg tubular junction member.

7. A heat-burst calorimeter as defined in claim 6 wherein that portion of the third tubular conduit which is in a thermal conductive relationship with said area thermopile is carried by a support member, said support member being inserted inside the bore provided in the heat sink body.

8. A heat-burst calorimeter as defined in claim 7 wherein the volume of said third tubular conduit is substantially equal to the sum of the volumes of said first and second tubular conduits.

9. A heat-burst calorimeter as defined in claim 7 wherein said support member comprises a tubular shaped member having a longitudinal narrow slit to form a relatively flexible member which holds the third tubular conduit in thermal contact with said area thermopile.

10. A heat-burst calorimeter as defined in claim 9 wherein said third tubular conduit is wound around the support member in a helical fashion.

11. A heat-burst calorimeter as defined in claim 10 wherein said third tubular conduit is wound on the support member in a lateral direction.

12. A heat-burst calorimeter as defined in claim 10 wherein said third tubular conduit is wound on said support member in a longitudinal direction.

13. A heat-burst microcalorimeter for monitoring the heat produced by a chemical reaction comprising a heat sink assembly including a thermal conductive heat sink body having an axial bore therein, first and second area thermopiles, each thermopile disposed inside the bore with the outer surface of each thermopile being in a thermal conductive relationship with the surface of the bore in the heat sink body, means for connecting said first and second area thermopiles in series opposition so that the electrical signal provided by the thermopiles is a true function of the heat produced by the chemical reaction, and tubular conduit means for carrying the chemical reactants and having a first opening at one end thereof for the introduction of the chemical reactants and a second opening at the other end thereof for the withdrawal of the reactants so that the chemical reactants flow in a continuous stream through said conduit means, said conduit means being in contact with said heat sink body over a sufficient distance to maintain the calorimeter in thermal equilibrium and including a first portion disposed in a thermal conductive relationship with said first area thermopile to define a reaction cell and a second portion disposed in a thermal conductive relationship with said second area thermopile to define a reference cell, the mixing of the reactants to provide the reaction taking place only in said reaction cell.

14. A heat-burst calorimeter as defined in claim 13 comprising in addition a shell-like member surrounding said heat sink assembly to maintain the assembly at a constant temperature.

15. A heat-burst microcalorimeter as defined in claim 13 wherein said conduit means comprises first and second tubular conduits, each conduit adapted to carry at least one chemical substance to be reacted, and a third tubular conduit in fluid communication with said first and second tubular conduit and including a first portion disposed inside said bore in thermal contact with said first area thermopile to define a reaction cell wherein the chemical reaction where heat is to be measured takes place, and a second portion disposed within said bore in thermal contact with said second area thermopile to define a reference cell.

16. A heat-burst calorimeter as defined in claim 15 comprising in addition connecting means to connect said first and second tubular conduits to said third tubular conduit whereby said chemical substances are transmitted to said third tubular conduit, said connecting means being disposed inside that portion of the bore in which the reaction cell is located.

17. A heat-burst microcalorimeter as defined in claim 16 wherein the tubular volume through which the reactants flow of said reaction cell is equal to the tubular volume of said reference cell.

18. A heat-burst microcalorimeter as defined in claim 17 wherein both the reaction cell and the reference cell have substantially equal surface areas in thermal contact with said first and second area thermopiles respectively.

19. A heat-burst microcalorimeter as defined in claim 16 comprising in addition first and second support members, said first support member disposed within said bore and carrying said reference cell, said second support member disposed within said bore and carrying said reference cell, said support members being arranged within said bore to provide a small gap between the ends of said members to prevent heat from being conducted from one support member to the other.

20. A heat-burst microcalorimeter as defined in claim 19 wherein each support member is relatively flexible in nature so as to maintain the reaction cell and the reference cell in thermal contact with said first and second area thermopiles, respectively.

21. A heat-burst calorimeter as defined in claim 19 wherein the portions of said third tubular conduit which form the reference and reaction cells are wound around the respective support members in a helical fashion.

References Cited

UNITED STATES PATENTS

| 3,211,531 | 10/1965 | Benzinger | 23—259 |
|---|---|---|---|
| 3,245,758 | 4/1966 | Benzinger | 73—190 |
| 3,273,968 | 9/1966 | Benzinger | 23—253 |
| 3,298,790 | 1/1967 | Benzinger | 73—190 |

MORRIS O. WOLK, Primary Examiner

S. MARANTZ, Assistant Examiner

U.S. Cl. X.R.

73—190; 23—253